United States Patent [19]

Mazzei

[11] 4,238,903
[45] Dec. 16, 1980

[54] ANIMAL TRAP

[76] Inventor: Louis J. Mazzei, 1408 E. Fountain Way, Fresno, Calif. 93704

[21] Appl. No.: 43,447

[22] Filed: May 29, 1979

[51] Int. Cl.³ .............................................. A01M 23/20
[52] U.S. Cl. .............................................. 43/61; 43/69
[58] Field of Search .................... 43/60, 61, 65, 67, 68, 43/69, 71

[56] References Cited

U.S. PATENT DOCUMENTS

| | | | |
|---|---|---|---|
| 224,498 | 2/1880 | Wiggins | 43/60 |
| 491,309 | 2/1893 | Herman | 43/60 |
| 799,472 | 9/1905 | Kirk | 43/68 |
| 1,220,743 | 3/1917 | Harriman | 43/60 |
| 1,587,536 | 6/1926 | Lobit | 43/61 |
| 4,127,958 | 12/1978 | Peters | 43/81 |

FOREIGN PATENT DOCUMENTS 990477 9/1951 France .............................................. 43/60

Primary Examiner—Nicholas P. Godici
Assistant Examiner—Robert P. Olszewski

[57] ABSTRACT

Herein described is an animal trap which is useful for trapping rodents such as mice and rats. The trap includes a trap receptacle having a substantially square trap box and a substantially square slide-in entry box which is adapted to slide into the trap box. A pair of pivot pins protrude from either side of the trap box. A base has a pair of upstanding side members. A pair of slots in the side members receive the pivot pins in the trap box to maintain the trap box in a substantially horizontal position. A ramp leads up to an entry opening in the slide-in entry box whereby opening and progresses to the rear of the trap box it causes the box to tilt to a vertical position trapping the animal therein.

2 Claims, 8 Drawing Figures

ANIMAL TRAP

BACKGROUND OF INVENTION

This invention relates to animal traps, and more particularly to a novel and improved animal trap which provides an expedient way of trapping and disposing of undesirable animals such as rats, mice and other rodents.

The animal trap of the present invention is comprised of a tilting trap box arrangement. In the prior art there are a number of such tilting traps which provide an arrangement whereby the animal to be trapped enters an entry of a box and walks to one end or the other and the box automaticlly tilts, catching the animal at the lower end and in a position whereby it can no longer reach the entry area.

The present invention provides a novel and unique feature in that it provides a box comprised of two sections, one of which is used to confine the trapped animal therein and the other section is slidably removed therefrom so that disposal of the trapped animal can be provided for without the necessity of touching or catching the animal with the hands.

SUMMARY OF THE INVENTION

Briefly described the present inventionn provides an animal trap comprised of a base arrangement with an entry platform having a ramp leading thereto. The base arrangment includes a pair of angularly disposed side members along the side thereof. The ramp is provided so that the animal which is to be caught by the trap can progress up the trap to an entry platform.

The trap box itself is comprised of two parts, the receptacle part and a sliding entry box. Both sliding entry box and the trap box are completely enclosed on five sides except that an entry hole is provided on the slide in entry box. The slide-in entry box is intricately fitted so that it slides into and out of the trap box with the open end on each end being disposed to face each other.

A pair of pivot pins are disposed on either side of the trap box and fits into slots in the vertically standing side members on the base. As the animal progresses up the trap in search of the bait which is disposed inside and at the rear of the trap box, as the animal enters the entry hole of the slide-in entry box it proceeds into the box towards the bait at the rear of the trap box. The box then becomes unbalanced causing it to pivot on the pivot pins, causing the trap box to become vertically disposed. This leaves the trapped animal at the bottom of the box. The side members of the box are composed of such a smooth type material that it is impossible then for the trapped animal to progress in any manner toward the entry hole and thus it is trapped therein.

The bait may be of a poison type which causes the death of the animal, or after a period of time the animal will die within the box in any event. The trap box then is removable from its pivot point and the sliding entry box can be removed from the trap box. Now the disposing of the trapped animal can be easily done.

DESCRIPTION OF THE DRAWINGS

These and other features and advantages will become more apparent to those skilled in the art when taking into consideration the following detailed description wherein like reference numerals indicate like and corresponding parts throughout the several views and wherein.

DESCRIPTION OF THE SHOWN EMBODIMENT

Figure 1:
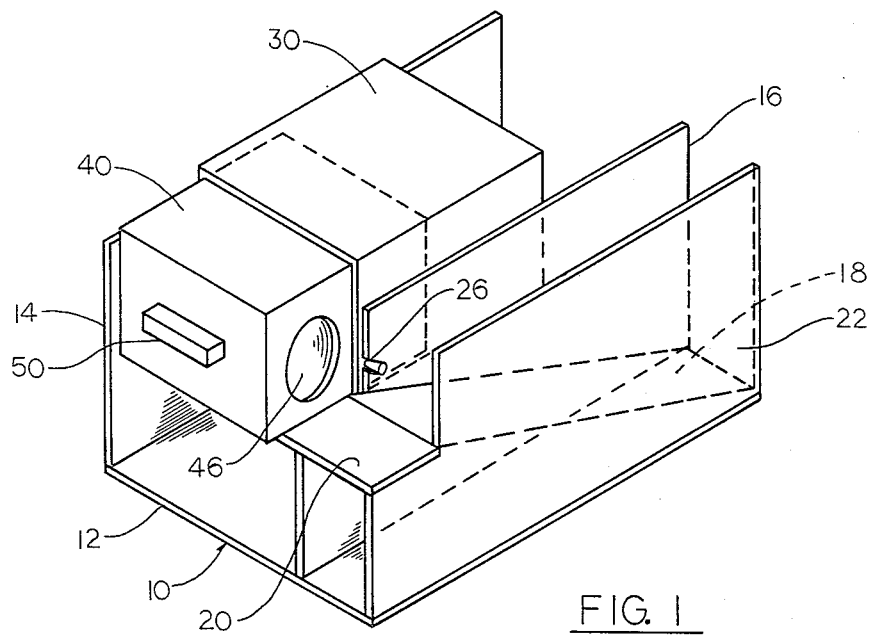
FIG. 1 illustrates a prospective view of one embodiment of this invention.
Figure 3:
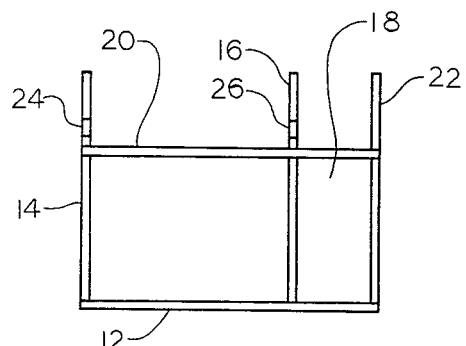
FIG. 3 is a front plan view of the base member of the present invention showing the remaining parts removed therefrom.
Figure 4:
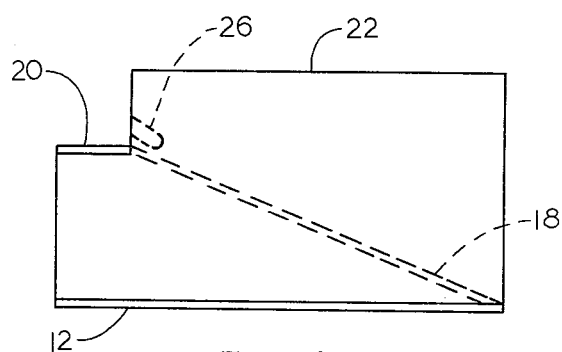
FIG. 4 is a side view of the part shown in FIG. 3.

Referring now to FIG. 1, there is shown a base member 10 and as shown collectively in FIGS. 1, 3 and 4, the base member 10 comprises a bottom platform 12 and a pair of upstanding side members 14 and 16. A slanted ramp 18 is provided and runs vertically alongside the entire length of the base platform 12 and is used so that the animal which is to be apprehended by the trap can progress up the platform to an entry platform 20. An upstanding sidewall 22 is provided on one side of the ramp 18 and the vertical upstanding side member 16 is provided on the other side of the ramp which confines the animal to its progression up the ramp toward the entry platform.

A pair of slots 24 and 26 are cut into the vertical upstanding side members 14 and 16 and are angularly disposed so that the bottom of the slots 24 and 26 are closer to the bottom platform 12 than are the top of the slots.

Figure 2:
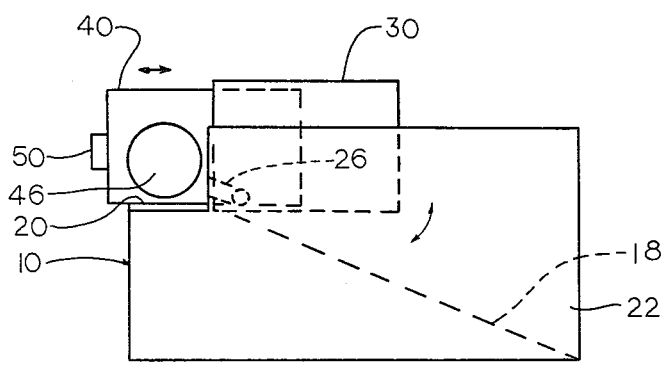
FIG. 2 is a side view of one embodiment of this invention.
Figure 5:
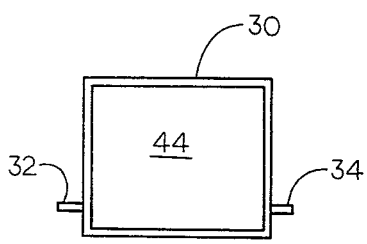
FIG. 5 is a front plan view of the receptacle box or trap of the present invention.
Figure 6:
FIG. 6 is a side view of the trap box shown in FIG. 5.

Referring now to FIGS. 5 and 6 in conjunction with FIGS. 1 and 2, there is shown the trap box 30 which is substantially rectangular in shape and is enclosed on all sides except the front end thereof. A pair of protruding pins 32 and 34 protrude from either side of the trap box 30 and are constructed and arranged so that they will slide into the slots 24 and 26 on the vertical upstanding side members 14 and 16. The trap box has facilities at the rear portion thereof to hold some bait 38 for the purposes hereinafter to be described.

Figure 7:
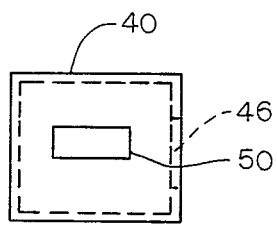
FIG. 7 is a view of the slide-in entry box which fits integrally into the trap box of FIGS. 5 and 6.
Figure 8:
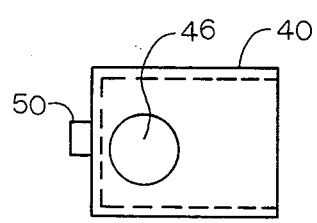
FIG. 8 is the side view of the slide-in entry box shown in FIG. 7.

Referring to FIGS. 7 and 8 in conjunction with FIGS. 1 and 2, there is shown the sliding entry box 40 which has an opening 46 on the side thereof. The sliding entry box 40 is constructed and arranged so it fits into the cavity opening 44 of the trap box 30 in a sliding tight fit arrangement. A suitable handle 50 is provided on the top of the sliding entry box for the purpose of removing it from the trap box 30 when desired.

In operation the sliding entry box 40 is positioned into the cavity opening of the trap box 30. The pivot pins 32 and 34 are placed into the slots 24 and 26 on the base member 10. The entry box 40 and trap box 30 are then delicately balanced in a horizontal position so that the entry opening 46 is disposed in a relationship with the entry platform 20. As the animal to be trapped senses or smells the bait 38 within the trap box 30, it will progress up the ramp 18 into the entry hole 46 of the sliding entry box 40. Then as it progresses toward the rear portion of the trap box 30 to get the bait, the balance of the trap box and sliding entry box is interrupted and the box will then swing to a vertical upstanding position, trapping the animal in the bottom of the box. Because of the fact that the box has substantially smooth side walls it is impossible for the animal to come up the side to the entry hole 46, which in some cases may be completely covered by the vertically upstanding side member 16.

After a period of time the animal will either die from being in the box for a sufficient period of time or the bait may be poisoned. The box may be easily moved from the base members by sliding the pins 32 and 34 from the slots 24 and 26, respectively. The grasping of the handle 15 and the box 40, the top sliding entry box can then be removed from the trap box and the animal can then be disposed of without the necessity of handling the animal in any way. Then the trap box 40 can be cleaned and reset for future use.

I claim:

1. An animal trap comprising:
   a trap receptacle having an entry opening, and including a slide-in entry box, a trap box, said slide-in entry box and being slidable into said trap box, whereby when an animal to be trapped enters said said entry opening in said trap receptacle, said trap receptacle becomes unbalanced and shifts to a vertical upstanding position, causing the slide-in entry box to slide into the trap box;
   a base including a pair of vertically upstanding side members; and,
   pivot means on said pair of vertially upstanding side members for balancing said trap receptacle in a substantially horizontal position.

2. An animal trap including:
   a trap receptacle having a trap box and a slide-in entry box, said slide-in entry box being slidable into said trap box;
   an entry opening in said slide-in entry box; a base having a pair of vertical upstanding side members, said side members including a pair of downwardly angled slots;
   a pair of pivot pins horizontally protruding from the sides of said trap box and adapted to be disposed into the slots on the vertical side members, said slots and pivot pins being disposed to maintain said trap receptacle balanced in a substantially horizontal position when said slide-in entry box is extended outwardly with respect to said trap box; and
   a ramp leading from the bottom of the base to said entry opening in said slid-in entry box whereby when the animal to be trapped enters the entry opening the trap receptacle becomes unbalanced and shifts to a vertical, upstanding position.

* * * * *